(12) United States Patent
Sima et al.

(10) Patent No.: US 8,800,042 B2
(45) Date of Patent: Aug. 5, 2014

(54) SECURE WEB APPLICATION DEVELOPMENT AND EXECUTION ENVIRONMENT

(75) Inventors: Caleb Sima, Woodstock, GA (US); Bryan Sullivan, Duluth, GA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2462 days.

(21) Appl. No.: 11/465,916

(22) Filed: Aug. 21, 2006

(65) Prior Publication Data
US 2006/0282897 A1   Dec. 14, 2006

Related U.S. Application Data

(63) Continuation-in-part of application No. 10/908,520, filed on May 16, 2005.

(51) Int. Cl.
*G06F 21/00* (2013.01)
(52) U.S. Cl.
USPC ............ 726/25; 717/168; 717/169; 717/170; 717/171; 717/172; 717/173
(58) Field of Classification Search
USPC .................................. 726/25; 717/168–173
See application file for complete search history.

(56) References Cited

U.S. PATENT DOCUMENTS

| | | | | |
|---|---|---|---|---|
| 6,006,328 A | * | 12/1999 | Drake | 726/23 |
| 7,299,359 B2 | * | 11/2007 | Hurley | 713/182 |
| 7,472,413 B1 | * | 12/2008 | Mowshowitz | 726/10 |
| 7,831,995 B2 | * | 11/2010 | Futoransky et al. | 726/1 |
| 2002/0040364 A1 | * | 4/2002 | Saito et al. | 707/9 |
| 2003/0159063 A1 | * | 8/2003 | Apfelbaum et al. | 713/200 |
| 2004/0117624 A1 | * | 6/2004 | Brandt et al. | 713/166 |
| 2005/0257267 A1 | * | 11/2005 | Williams et al. | 726/25 |
| 2005/0273861 A1 | * | 12/2005 | Chess et al. | 726/25 |
| 2006/0101334 A1 | * | 5/2006 | Liao et al. | 715/523 |
| 2007/0101409 A1 | * | 5/2007 | Palekar et al. | 726/4 |

OTHER PUBLICATIONS

International Bureau, International Preliminary Report on Patentability, 8 pages.

* cited by examiner

*Primary Examiner* — Ghazal Shehni

(57) ABSTRACT

Providing secure web application development and operation. In a web development environment, code developed for the web application is analyzed to identify vulnerabilities and remedial actions are identified. The remedial actions may be automatically invoked or a developer can be prompted to take particular actions to remediate the vulnerability.

20 Claims, 5 Drawing Sheets

SECURE WEB APPLICATION DEVELOPMENT AND EXECUTION ENVIRONMENT

RELATED APPLICATIONS

This application is a continuation in part of U.S. Patent Application have a title of SECURE WEB APPLICATION DEVELOPMENT ENVIRONMENT filed on May 16, 2005 and assigned Ser. No. 10/908,520.

BACKGROUND OF THE INVENTION

Security and the protection of digital assets is a key enabler of our information-driven economy. The information security industry has evolved from a niche corner of information technology to something that pervades the industry itself. Despite this increased attention to security, the complexity of information systems and the reliance upon them creates a fragility that adds up to risk to organizations of all sizes. Vulnerabilities are inherent in nearly everything, and computer systems are no exception. Software vulnerabilities have many different origins. For instance, in some cases, a coding standard can be poorly written, which may cause all software written to these specifications to be faulty.

Bugs are an inevitable reality of the software development process, and some of these bugs can create serious vulnerabilities. Additional vulnerabilities may be introduced when a system is installed, configured, and customized for individual use. In general, any stage during the software development and usage lifecycles creates risk for the introduction of vulnerabilities. Some vulnerabilities are innocuous and some can be critical in nature. Identifying the key risks and their solutions is one of the most critical aspects of information security.

Research has historically shown that successful malicious penetrations upon computer systems and well known worms and viruses have been based upon known vulnerabilities. Vulnerabilities may exist at any aspect of computing systems. For instance, vulnerabilities may exist in typical desktop applications and/or operating systems, network layer components, etc. Furthermore, vulnerabilities may exist at the application layer, which may include weaknesses created by the integration of one or more application components, including in-house custom programming, operating systems, databases, web pages, and middleware. These vulnerabilities are potentially unique to each integrated system and can be added and removed dynamically with each change to any system component.

Currently, there are various vulnerability assessment solutions that enable information technology (IT) professionals to proactively address vulnerabilities at various aspects of computing systems, including network layer, application layer, etc. By way of example, various tools exist for identifying security vulnerabilities in computing systems. Anti-virus tools exist for determining desktop vulnerabilities in applications, operating systems, etc. Within the web application space, various assessment tools also exist, which may employ various heuristics to identify vulnerabilities in web applications. Typically, web application assessment tools have the ability to identify dynamic "unique" vulnerabilities using adaptive and behavioral techniques, as well as standard "static" vulnerabilities. Web application assessment tools may map an entire web system, including all links, proprietary code, connections to data sources, etc.

One common technique that is employed by adverse parties is the manipulation of data inputs. For instance, an adverse party may manipulate the data inputs by providing overlong inputs, improperly formatted inputs, embedded control characters, etc. Using such techniques, vulnerabilities can be exploited. Thus, it is important to have a technique for accessing the data value vulnerability of a system.

Despite the existence of various types of proactive tools for assessing vulnerabilities in computing systems, there is a need for improved systems, methods, software, etc. for providing secure web application development.

BRIEF SUMMARY OF THE INVENTION

Various embodiments of systems, methods, software tools, etc. for providing secure web application development are provided. One embodiment comprises a method for developing a secure web application. One such method comprises: analyzing code associated with a web application to identify at least one vulnerable input; and validating the at least one vulnerable input.

Another embodiment is a web application development environment comprising: an input identification module that analyzes web application code to identify vulnerable user inputs; and a validation module that validates the vulnerable user inputs identified by the input identification module.

Yet another embodiment is a system for developing a secure web application. One such system comprises: a web application development environment; and a user input validator integrated with the web application development environment, the user input validator comprising: logic configured to analyze code associated with a web application being developed via the web application development environment; logic configured to identify vulnerable user inputs in the web application; and logic configured to automatically validate the identified vulnerable user inputs.

DETAILED DESCRIPTION OF THE INVENTION

Various embodiments of systems, methods, software tools, etc. are provided for implementing a secure web application development environment. Numerous embodiments are described below with reference to FIGS. 1-6. As an introductory matter, however, one example of a secure web application development environment will be briefly described. In general, the secure web application development environment comprises software tool(s), logic, functionality, etc. for validating input-related data and/or other vulnerabilities associated with a web application during the development process (i.e., within the development environment). The validation logic may automatically validate the input-related data or, in some embodiments, may support an interactive validation wizard. In further embodiments, the validation logic may be implemented as secure object components that may be dropped into the web application for verifying, validating, etc. the inputs and vulnerabilities, preventing certain operations that create vulnerabilities or that are inherently vulnerable, forcing certain operations and/or practices, etc. Thus, one aspect of the present invention is to identify vulnerabilities during the application development, and then generate code or objects that can be embedded within the web application and that operate to verify, validate and/or remediate data inputs, operations, policies, accesses, etc.

The validation logic may be implemented during the initial development process to enable a developer to develop secure web applications. In these embodiments, the secure web application development environment may further comprise input identification logic for analyzing the code associated with the web application during the development process. The input identification logic identifies the inputs and/or vulnerabilities associated with the code. The input identification logic interfaces with the validation logic. In this manner, the input identification logic passes the inputs, vulnerabilities, etc. to the validation logic to be validated. As described in more detail below, the secure web application development environment may also be integrated with a web application assessment tool. The web application assessment tool identifies the inputs, vulnerabilities, etc. to be validated, and passes them to the development environment for validation, remediation, etc.

Figure 1:
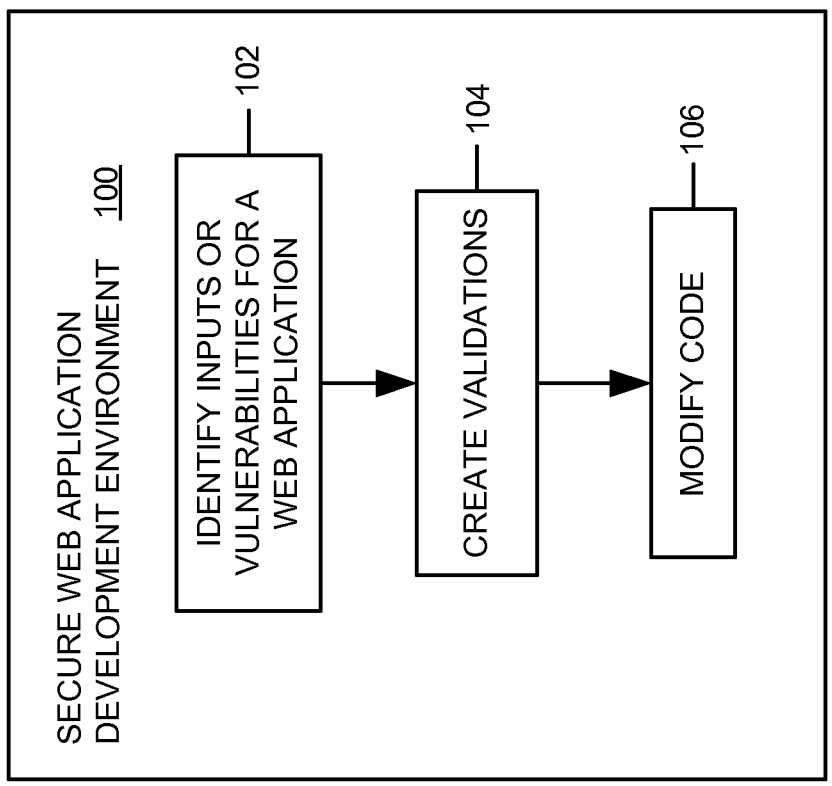
FIG. 1 is a block diagram illustrating one embodiment of a secure web application development environment.

FIG. 1 illustrates the architecture, operation, and/or functionality of one of a number of embodiments of a secure web application development environment 100. As the name suggests, secure web application development environment 100 targets web application security from within the development environment. Secure web application development environment 100 may be implemented with any of a variety of web development platforms. In one embodiment, secure web application development environment 100 is implemented using Microsoft ASP.NET. One of ordinary skill in the art will appreciate, however, that other web development platforms may be used (e.g., JavaServer Pages, ColdFusion, Microsoft Internet Information Services (IIS), Apache-based server scripts, hypertext preprocessor (PHP) scripts, etc.).

Referring to FIG. 1, at block 102, identification logic associated with secure web application development environment 100 identifies inputs, vulnerabilities, etc. associated with the web application being developed. This identification logic may be configured to identify the inputs and/or vulnerabilities in a number of ways. For instance, in one implementation, the identification logic analyzes the code associated with the web application. It should be appreciated that the code analysis may be performed on source code (e.g., HTML, ASP, etc.), either on the server side or client side. The identification logic may also perform a static analysis on the binaries. As described in more detail below, the identification logic may also identify the inputs, vulnerabilities, etc. via data provided by a web application assessment tool. In further embodiments, the identification logic may be implemented using secure object components, each of which may be configured to identify specific types of inputs, vulnerabilities, etc. associated with the web application.

After the inputs and/or vulnerabilities are identified, at block 104, additional logic is generated or made available to the development environment for the creation of a secure web application 100 that can perform a validation process. The validation process involves looking at the vulnerabilities and the operation of the code, which may also include examining any input data to determine bad or erroneous inputs. Each input is associated with a type of data. For instance, the inputs can be email addresses, street names, zip-codes, user identifications, etc. Each input has an associated pattern that can be used to verify or identify a match with the data type. For instance, an alphanumeric string, followed by a "@" character, followed by another alphanumeric string and ending in a known dot extension (i.e., .com, .net, .edu, .gov, etc) is a pattern that matches with an email address data type. Thus, in one embodiment, the additional logic is code or objects that can be directly linked or incorporated into the web application code and, when executed provides the vulnerability security. At block 106, further logic associated with secure web application development environment 100 modifies the code associated with the web application to implement code that operates to validate inputs.

Figure 2:
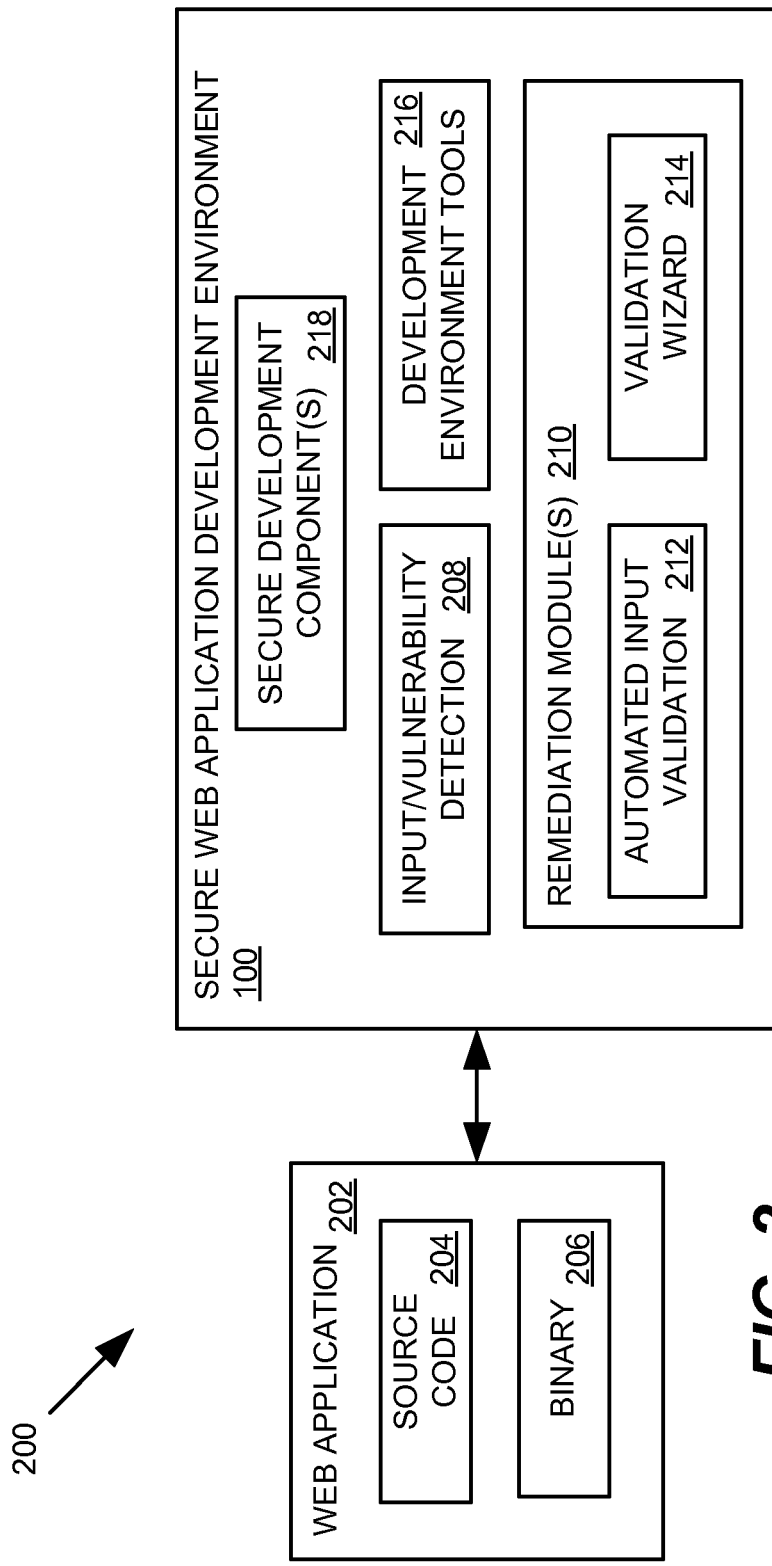
FIG. 2 is a block diagram illustrating one embodiment of a system containing a secure web application development environment.

FIG. 2 illustrates a system 200 in which an embodiment of secure application development environment 100 may be implemented. As illustrated in FIG. 2, secure application development environment 100 interfaces with source code 204 and/or binary 206 associated with a web application 202. In the embodiment illustrated in FIG. 2, secure application development environment 100 comprises an input/vulnerability detection module 208, development environment tools 216, and remediation module(s) 210. Development environment tools 216 comprise the various tools associated with the particular development platform (e.g., code editor, debugger, GUI builder, compiler, various visual tools, etc.).

Input/vulnerability detection module 208 comprises the logic, functionality, etc. for scanning web application 202 and identifying input-related data and/or vulnerabilities associated with web application 202. Remediation module(s) 210 comprise the logic, functionality, etc. for validating, repairing, remediating, or otherwise resolving the web application vulnerabilities. As illustrated in FIG. 2 and described in more detail below, remediation module(s) 210 may comprise various mechanisms for resolving the vulnerabilities. An automated input validation module 212 may be employed which supports automatic resolution of the vulnerabilities. A validation wizard 214 may be used to provide an interactive means for resolving the vulnerabilities.

The validation wizard 214 can be adapted to detect, resolve, remediate, identify, etc. a wide variety of vulnerabilities. It should be appreciated that vulnerabilities can include many different aspects. As previously mentioned and described in more detail below, input data is one particular vulnerability that obtains much remediation focus in that it is a vulnerability area that receives direct impact from hostile user forces. However, the vulnerability wizard 214 is concerned with a wider variety of vulnerabilities that not only include input data, but code design practices, operations (such as opening, closing and accessing of files), allocation and deallocation of operational memory, use of security files for authentication and identification, security policies, use of cookies, and many other vulnerabilities. As non-limiting examples, some of these vulnerabilities are described below. It will be appreciated that the present invention is not limited to implementation of any one or more of these vulnerability assessments and remediations, although in and of themselves, each such example may be individually novel and unique.

Force non-persistent authentication. Many web applications store authentication credentials in persistent cookies (those that remain on the user's computer or in memory). Such practices create attack vulnerabilities for anyone that may have access to the user's computer, either directly or through a network connection. The present invention alleviates this vulnerability by modifying the web application to prevent storage of authentication credentials in persistent cookies on users' machines. In one embodiment, this operation may include making modifications to the application configuration file.

Force secure logins. Many web applications allow users to login via secure connections and non-secure connections. Login access via non-secure connections is inherently a vulnerability. The present invention operates to alleviate this vulnerability by identifying code that allows logins to occur and forcing the code to of the application to require use of SSL for its login pages. In one embodiment, this operation may include making modifications to the application configuration file.

Hide comments. As programmers and developers create code and applications, a typical practice is to include comments, embedded within to code, to assist in further or future modifications of the code. Access to such comments by users can result in identifying code vulnerabilities. The present invention operates to alleviate this vulnerability by hiding programmer comments from users. In one embodiment, this aspect of the invention is implemented by modifying the source code of the web pages. This aspect of the invention advantageously reduces vulnerabilities associated with database connection string disclosure and username/password disclosure, as well as others.

Disable cookieless authentication. Some web application allow for authentication by storing an authentication token within the query string of the URL used to access the web application page. This is referred to as cookieless authentication. The present invention can identify code that enables cookieless authentication and then modify the code to prevent the same. In one embodiment of the present invention, this aspect of the present invention can be implemented by a module that performs modifications to the application configuration file.

Disable cookieless session state. Some web applications allow for the storage of the session token within a query string of the page URL. This is referred to as cookieless session state. Thus, without further accessing a cookie located on the user's computer, a session can be continued simply by embedding the session token within the query strings. The present invention can identify code that enables cookieless sessions and then modify the code to disable such operation. In one embodiment of the invention, this aspect of the present invention can be implemented by a module that makes modifications to the application configuration file.

Make cookies invisible to client-side script. Cookies relied upon by a web application can contain information that if obtained, can be used to exploit the web application. Thus, the ability for client-side scripting code to access such cookies is a vulnerability. The present invention operates to prevent such access, thereby making the cookies invisible to client-side scripts. In one embodiment of the present invention, this aspect of the present invention operates to modify source code in the web application.

Disable use of test credentials. During the development of code, it is common for coders and developers to place hooks, stubs, test routines, etc. into the code to facilitate debugging and testing of the code. Such code can create vulnerabilities to a web application if identified and exploited. The present invention operates to alleviate this vulnerability by identifying and disabling any such test authentication credentials created by the programmers, as well as other test code. In one embodiment of the present invention, this aspect of the invention is implemented by making modifications to the application configuration file.

Force custom errors. In the development of web applications, it is common for programmers to include core dumps, stack dumps, source code identifications and detailed information dumps upon the occurrence of an operational error. By examining such information, an attacker may identify vulnerabilities in the web application. The present invention operates to alleviate this vulnerability by forcing the web application to limit the information provided to the user upon detecting an error. This aspect of the present invention is implemented by examining the code to identify such error processing and modifying the code and/or the application configuration file to prevent the provision of the information.

Disable debugging. During the development of a web application, a programminer may include hooks or code that enables the programmer to place the web application into a debugging mode. The "safe" operating mode of WINDOWS is an example of such a feature that actually attained commercial necessity. However, many such features or backdoors actually are only useful to a programmer and create many vulnerabilities that could be exploited. The present invention operates to alleviate this vulnerability by preventing code, the execution of code, or the entrance of a web application into debugging mode. In one embodiment of the present invention, this aspect of the invention is performed by making modifications to the application configuration file.

Enable ASP.NET viewstate machine-authentication-code check. Microsoft ASP.NET Web Forms pages are capable of maintaining their own state across multiple client round trips. In web forms pages, their viewstate is sent by the server as a hidden variable in a form, as part of every response to the client, and is returned to the server by the client as part of a postback. Typically, the viewstate information is passed as plain text to the client. Thus, hostile forces can detect, intercept and tamper with this value. To enhance the security of the information passed in the viewstate variable, the machine-authentication-code attribute can be enabled. When enable, this helps to detect any possible attempt at corrupting the original data. The present invention alleviates the risk associated with tampering of the viewstate by examining the web application code and ensuring that the machine-authentication-code parameter is always set during operation. In one embodiment of the present invention, this aspect of the invention is performed by making modifications to the application configuration file.

Apply unique key to ASP.NET viewstate. To further enhance the security and protection of the viewstate information, the present invention incorporates the use of a unique key to encode the contents of the view state. Advantageously, this aspect of the present invention alleviates certain types of authentication bypass attacks. In one embodiment of the present invention, this aspect of the invention is performed by making modifications to the application configuration file.

Restrict script inside page frames. Vulnerabilities are created in web application when a user is able to execute a client-side script inside the page frames of the web application. The present invention operates to alleviate this vulnerability by preventing client-side script from executing inside frames in web pages. In one embodiment of the present invention, this aspect of the invention is performed by making modifications to the application configuration file.

Rename backup/archive files. Most web applications create backup and/or archive files with easily detectable and consisting naming conventions. This knowledge enables hackers to search for and identify these files, then examine the files for information that can be exploited as vulnerabilities. The present invention operates to alleviate this vulnerability by renaming such files, thereby making it more difficult for attackers to view the source code of any backup or archive files that may exist on the server. In one embodiment of the present invention, this aspect of the invention is performed by making modifications to the application configuration file.

Force login to use POST instead of GET. In the creation of a login script, the programmer can utilize either the POST or GET method. The POST method requires the entry of the authentication information similar to filling out a web based form. The GET method is more akin to the use clicking on a link. The GET method introduces vulnerabilities into the web application. The present invention operates to alleviate this vulnerability by forcing the login application to use the POST method rather than the GET method. In one embodiment of the present invention, this aspect of the invention is performed by making modifications to the application configuration file.

Disable sliding authentication expiration. Some web applications utilize sliding authentication expiration which allows the valid life of an authentication token to be extended every time the authentication token is used. Thus, if the authentication token is set to expire in 10 minutes, every time the token is used, the expiration count is reset and the authentication token is alive for another 10 minutes. As a result, every use of the authentication token prolongs the expiration. The present invention alleviates this vulnerability by disabling sliding authentication expiration.

Disable tracing. One of the techniques used by programmers and developers is stack tracing. This technology enables a programmer to analyze the operation of a web application on an individual page basis, as well as the overall application. The present invention operates to alleviate this vulnerability by disabling stack tracing on both the individual page basis and the overall application basis.

Force unique authentication cookie. When a web application is invoked, an authentication token is created for use with that web application. By capturing the authentication token, an attacker may gain access to restricted web sites posing as an authenticated user. The present invention alleviates this vulnerability by creating a unique authentication token for each web application. This aspect of the present invention prevents users from gaining unintended access to restricted web sites.

It will be appreciated that although this description is focused on a development environment, the present application is also applicable to run-time operation. The present invention can be incorporated into an application that remains resident on a system platform and analyzes object code, binaries or even real-time operations of a web application to identify vulnerabilities. Once identified, the user can be prompted of their diction and if remedial measures can be performed, can prompt the user to allow such actions to be taken.

As mentioned above, input/vulnerability detection module 208 may perform a code analysis on source code 204 or binary 206. As illustrated in FIG. 2, input/vulnerability detection module 208 may support various secure development components 218.

One embodiment of a secure development component 218 comprises an input validation component. The input validation component may be configured to check, for example, incoming data on web forms to prevent exploits. In one embodiment, the input validation component comprises an ASP.NET Validator object, which provides methods to be used in screening input supplied by the user of a web application. The input validation component may be used to check any input-related data associated with web application 202, including any of the following, or other, data: Form data (POST data); Query string data (URL parameters); HTTP headers; Cookies. The input validation component may be configured to coexist with other data validation components supplied by the user, including components in Digital Fusion's .NET library product(s) and those supplied by Microsoft with ASP.NET, to name a few. As known in the art, ASP.NET enables validators to be run on the client side, on the server side, or both. For security purposes, secure development components 218 may be configured (in one embodiment) to force server-side execution of validator(s). It should be appreciated, however, that client-side validators may also be supported.

The input validation component may be configured to use regular expressions to scan input. For instance, it may support a list of expressions that are provided by a software vendor. In this regard, the vendor may supply the expressions via a data file that may be easily updated without code changes. The software vendor may also supply a simple editor that a developer may use to add additional expressions to the data file.

The input validation component may support both whitelisting and blacklisting of data. Whitelisting includes any means of data validation that strictly specifies what is acceptable input—all other input is rejected. Blacklisting includes any means of data validation that specifies what input is unacceptable—all other input is assumed to be acceptable. Whitelisting is generally preferred in the security community because it is much stricter, and less prone to "zero day" vulnerabilities. When properly implemented, it also has the beneficial side effect of improving the usability of the application. Nonetheless, it should be appreciated that whitelisting, blacklisting, and other data validation methodologies may be employed.

For example, in one embodiment, blacklisting may be used for (1) checking fields such as free-form text boxes that cannot be whitelisted and (2) detecting when potential attacks have occurred for auditing purposes. The whitelisting feature may be configured with a number of expressions for commonly used field types such as, for example, Full Name, Email Address, URL, etc. Blacklisting may also be supported in circumstances in which free-form fields cannot be whitelisted. Because a given piece of user-supplied data might be used in several contexts by the application in the back-end, the input validation component may enable the developer to configure it by identifying how the form data will be used, including: Displayed on a page (Cross-site scripting); Used in a SQL query (SQL injection); Used in an LDAP query (LDAP injection); Used in a filename (directory traversal); Used in a Windows command line (pipes, etc); Used in a Unix command line (rules are different); Used in an HTTP header item in a reply (check for CR/LF); Used in a Cookie (check for script).

Each of the above example checks might correspond to one or more regular expressions in the back end. Checks may default to "on." In this manner, if a software vendor performs an update to add a check for a new type of attack, existing sites will automatically be protected.

In another embodiment, the input validation component may be configured to check for HTML manipulation attacks where an attacker alters the served HTML before posting. This feature may support both static and dynamically generated lists.

With regard to whitelisting of data, the input validation component may support various additional features. For example, the input validation component may enable a developer to choose a data type (e.g., "zip code") to which a given input should match. This will serve to select regular expression(s) against which the data will be matched. The whitelisting feature may support any form of web input, including field forms (POST data), query data (URL parameters), HTTP headers, and cookies, to name a few. The input validation component may also enable checking of HTML form field lengths. The input validation component may also be configured to enable a developer to edit a data type/expression. The list of data types, and their associated regular expressions, may be supplied in a convenient user-readable format such as XML. The developer may edit the list to add their own expressions as desired.

The input validation component may support special filtering for dangerous data types. Some data types may be prone to misuse in indirect attacks against targets other than the web application itself. These will have particularly strict filter rules supplied. For example, these are the cases where the use of multiple regular expressions for a single data type might be required. These data types may include: Internet URLs; Intranet URLs (also allows file://); Domain names; and Email addresses The input validation component may also include a means for checking non-text field types for HTML manipulation attacks. This may include: Check boxes (<INPUT type=checkbox>); Radio buttons (<INPUT type=radio>); Submit buttons (<INPUT type=submit>); Selection lists (<SELECT>); Microsoft_VIEWSTATE hidden field; ASP.NET controls defined in System.Web.UI.WebControls.

The input validation component may support dynamically created HTML. Some selection lists on forms may be dynamically created in server-side user code. The input validation component may be configured to support these.

The input validation component may also log a security message to inform the developer of excessive whitelisting errors.

With regard to blacklisting of data, the input validation component may support various features. The developer may choose one or more data usage (e.g., "in a SQL query") for a given input. This may serve to select regular expression(s) against which the data will be matched. Multiple blacklist types may be applied to a given data type. When blacklisting is chosen for a given piece of data, all selections may default to "on" unless otherwise specified by the user. The input validation component may support all web inputs, including field forms (POST data), query data (URL parameters), HTTP headers, and cookies.

Another embodiment of a secure development component 218 comprises an input filtering component. The input filtering component may be configured to filter HTML input by a web site user for safe later display on a web page. The input filtering component may be configured to remove dangerous elements (e.g., HTML elements tags not explicitly allowed by the developer, <SCRIPT> tags, etc.). The developer may also be able to choose a small subset of simple formatting tags that can be allowed in user input. The list of attributes which may be passed through may be hard-coded. Following is an example of suitable attributes:
    <P> for paragraph
    <PRE> for preformatted text
    <B> for bold
    <I> for italic
    <U> for underline
    <UL> for unordered list
    <OL> for ordered list
    <LI> for list item
    <H1> to <H6> for section headings
    <A> for anchors (hyperlinks)
    <IMG> for inline images Within the allowed tags, only a subset of attributes may be allowed. All other attributes may be stripped. Following is an example of allowed attributes:
    LANG=to specify the language of the included text
    SRC=to specify the graphic file to use for an <IMG> tag.
    ALT=to specify alternate text for an <IMG> tag.
    HREF=to specify the target of an <A> tag.

For the allowed attributes above, the data within may be strictly whitelisted using rules defined within the input validation component. Examples of these rules include:
    LANG: Language code (Alphanumeric plus hyphen, 17 characters max)
    ALT: Simple text (alphanumeric plus space, hyphen, period, exclamation, comma, semicolon, parentheses, single quote).
    HREF, SRC: Strict Internet URL parsing Another embodiment of a secure development component 218 comprises an error handling component. Various secure development components 218 in secure web application development environment 100 may be able to generate events to indicate that certain security-related conditions exist. The developer may handle these at the page level, or application-wide, to implement his desirable logging strategies. A small bit of glue code may be placed in the appropriate function by a user wizard tool (e.g., Visual Studio Wizard), which will call the error handling component. This function may perform all handling of errors generated by secure development components 218.

Another embodiment of a secure development component 218 comprises a login management component. The login management component may supply objects and methods for authenticating users of a web application. The login management component may provide a sub-classed version of web development platform classes that may automatically perform security-related tasks. For example, the login management component may automatically detect attempts to brute force a password or otherwise abuse the login process, and raise appropriate events that will cause the error handling component to log an appropriate message. The login management component may delay the response when the hack attempts occur, to slow down attempts to brute force a password. The login management component may support easy manipulation of passwords in non-cleartext form. The login management component may be designed with a wrapper that precludes the developers from having to touch the plain-text password in the web application code. A password validator may be supplied for use on a form where the user can select or change their password. This may apply a reasonably strict password policy, such as requiring at least one non-alphanumeric symbol and making sure no component of the user's name or other information is contained within the password.

The login management component may support application-defined password stores. For example, the developer may be able to store user/password information in any way they see fit using their own code. The login management component may hash passwords by default, and hand them to user code in that form. The login management component may encourage strong passwords by supplying a special validator for user-supplied passwords that enforces an appropriately strict set of password selection rules. The login management component may detect attempts to brute-force a login by maintaining a session count of failed logins. The login management component may interact with the error handling component described above to log possible attacks.

Another embodiment of a secure development component 218 comprises an integration component. The integration component provides a means for implementing the other secure development components 218 within a new or existing web application project. The objective of the integration component is to make using secure development components 218 user friendly. The integration component may support various drag-and-drop features, wizards, etc.

The integration component may enable tasks to be imported from a web application assessment tool. In other words, the results of a web application assessment scan may be imported via the integration component. The integration component is configured to filter the imported vulnerabilities to just those that can be solved by the system. Furthermore, the integration component may support vulnerable field information in a task list, so the developer can invoke a wizard to repair, validate, remediate, etc.

Figure 4:
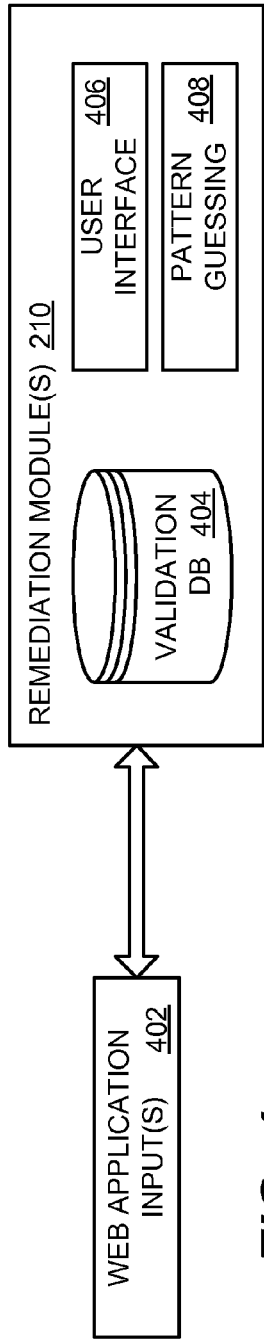
FIG. 4 is a block diagram illustrating an embodiment of the remediation module(s) of FIG. 2.
Figure 3:
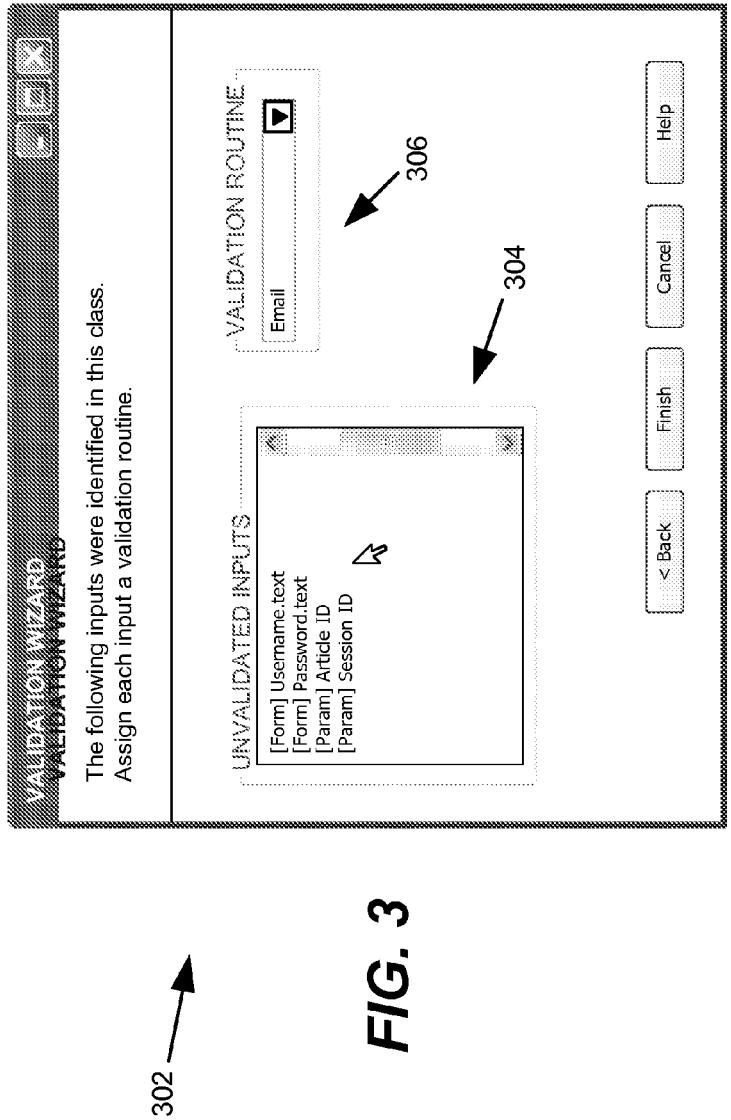
FIG. 3 is a screen shot illustrating an embodiment of the validation wizard of FIG. 2.

As illustrated in FIG. 3, secure web application development environment 100 may support invoking a validation wizard 302 right from the description of the vulnerability. Validation wizard 302 may include a list of unvalidated inputs (list 304—FIG. 3). As further illustrated in FIG. 3, validation wizard 302 may also include a drop-down functionality 306 for choosing a particular validation strategy, routine, etc. In this regard, it should be appreciated that remediation module(s) 210 may include logic, functionality, etc. for recommending validation strategies to the developer via a validation wizard 302. Referring to FIG. 4, remediation module(s) 210 may include a validation database 404 that defines strategies for validating certain types of web application input(s) 402 (or other vulnerabilities). Secure web application development environment 100 may also receive input from the developer (via a user interface 406) to facilitate the validation process. Furthermore, remediation module(s) 210 may also include a means for performing pattern guessing (module 408) on web application input(s) 402. For instance, based on the manner that input is presented, the remediation modules attempt to make an educated guess as to what the data represents. For instance, in one embodiment of the invention, the code can be examined to determine the type of data inputs that are available or to identify other vulnerabilities. In addition, not only the code but also support files, configuration files, library files, etc., can be examined for coding errors, misconfigurations or the like. As a result, a module can be included in the source code to remediate the input and ensure it conforms, if possible, to the required input. Thus, if an email address is expected, the module could examine the input to verify it is in the proper format. If the data looks like a proper email address, however, the character "@" is replaced with a "#" character. Likewise, if an operational restriction is being violated, such as placing an authentication token in the accessing string, and automatic remediation steps can be performed (i.e., removing the authentication token).

Referring again to validation wizard 302 illustrated in FIG. 3, a developer may select one of the unvalidated inputs from list 304, and then select a specific validation strategy from the dropValidation wizard 302 may be invoked after an assessment scan is performed and the vulnerability data is imported to the system. Validation wizard 302 may lead the developer directly to the point where repairs need to be made. Validation wizard 302 wizard may analyze source code 204 (both HTML and the code-behind script) and indicate which settings. Buttons in the wizard may be provided to repair vulnerabilities with one click. The wizard may also list individual vulnerabilities related to, for example, Form fields, Query strings (parameters), cookies, etc. This information may come out of the assessment scan and augmented by scanning source code 204. Simple buttons may be provided to apply appropriate input validation to each item by using the input validation component described above.

For instance, if the developer runs a web application assessment scan and gets an "SQL Injection" vulnerability, the wizard enables the developer to select the vulnerability and make the appropriate changes to the application. In addition to repairing forms, the wizard may enable the developer to make other changes to the web application. For example, the wizard may enable the developer to create a global error handler and error page for a web application. The wizard may also be invoked in a batch mode to repair an entire web application. In batch mode, the wizard will scan the entire web application, including all forms.

The integration component may also support a custom wizard that adds a web form to a development project. The custom wizard includes appropriate hooks that support secure object components 218. The custom wizard may support creating the any of the following, or other, types of forms: a general purpose web form (using the input validation component); a login form (using the input validation component and/or the login management component); and a password change form (using the input validation component and/or the login management component).

Another embodiment of a secure object component 218 comprises an encryption component. The encryption component may take on a variety of forms and is not limited to the traditional meaning of encryption. For instance, as used within the context of this description, encryption can refer to any of a variety of secure manipulations to render data unreadable without the requirement of additional effort. Thus, encryption can also refer to hashing algorithms, compression or other data security techniques. Some web applications may be attacked via methods that rely on internal information leaking from the application, such as sequence numbers or record keys. One way that information can leak from a web application is via cookies which are transmitted by the end user's browser. In order to avoid this type of problem, an encryption component may be used as a means for encrypting the contents of cookies when they are set and decrypting them when they are retrieved. The encryption component may use industry-standard encryption/decryption services, such as those provided by Windows. The encryption component may support easy encryption of cookies as they go to the client, and decryption when they return. Persistent cookies may also be supported, which persist the cryptographic key that is being used. Multi-value cookies may also be supported. For example, multiple name-value pairs in a single cookie may be provided.

Figure 5:
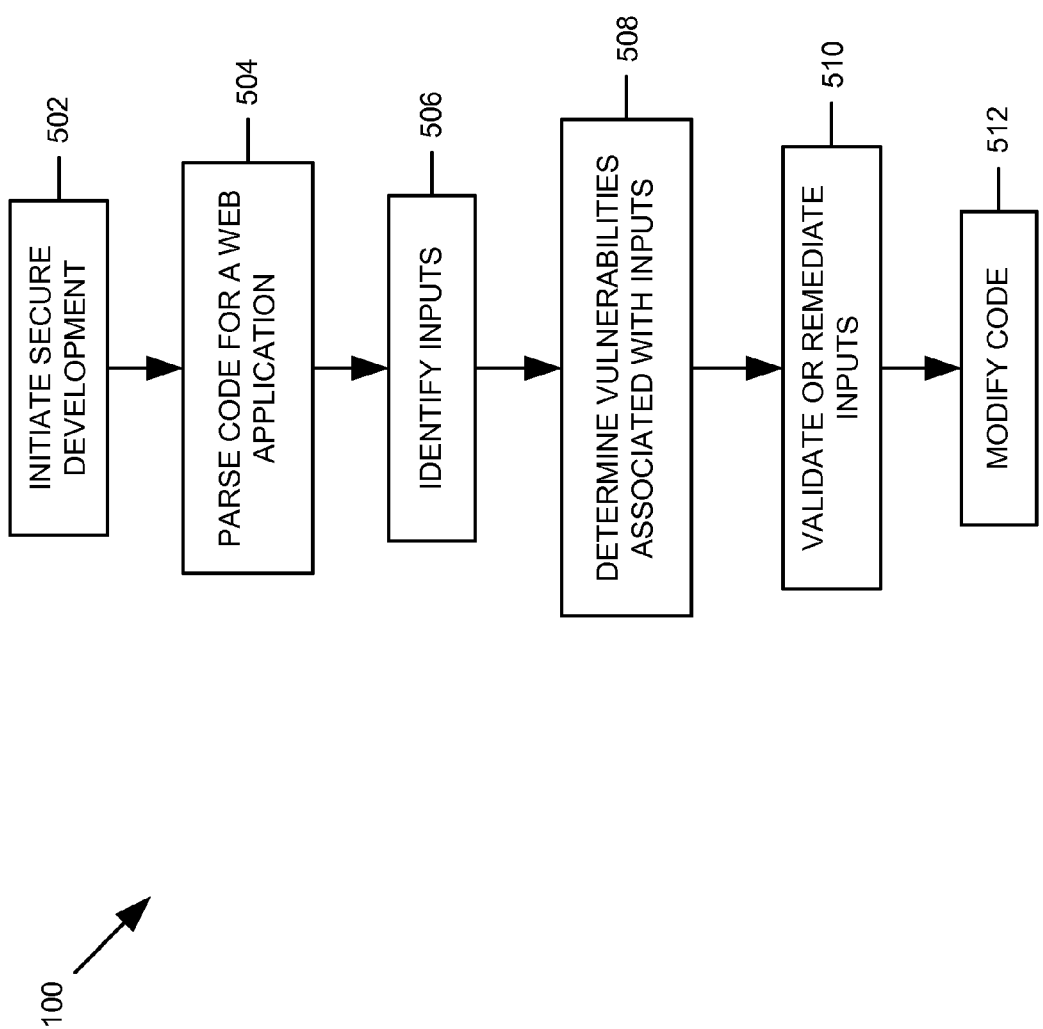
FIG. 5 is a flow chart illustrating the architecture, operation, and/or functionality of an embodiment of the secure web application development environment of FIGS. 1 & 2.
Figure 6:
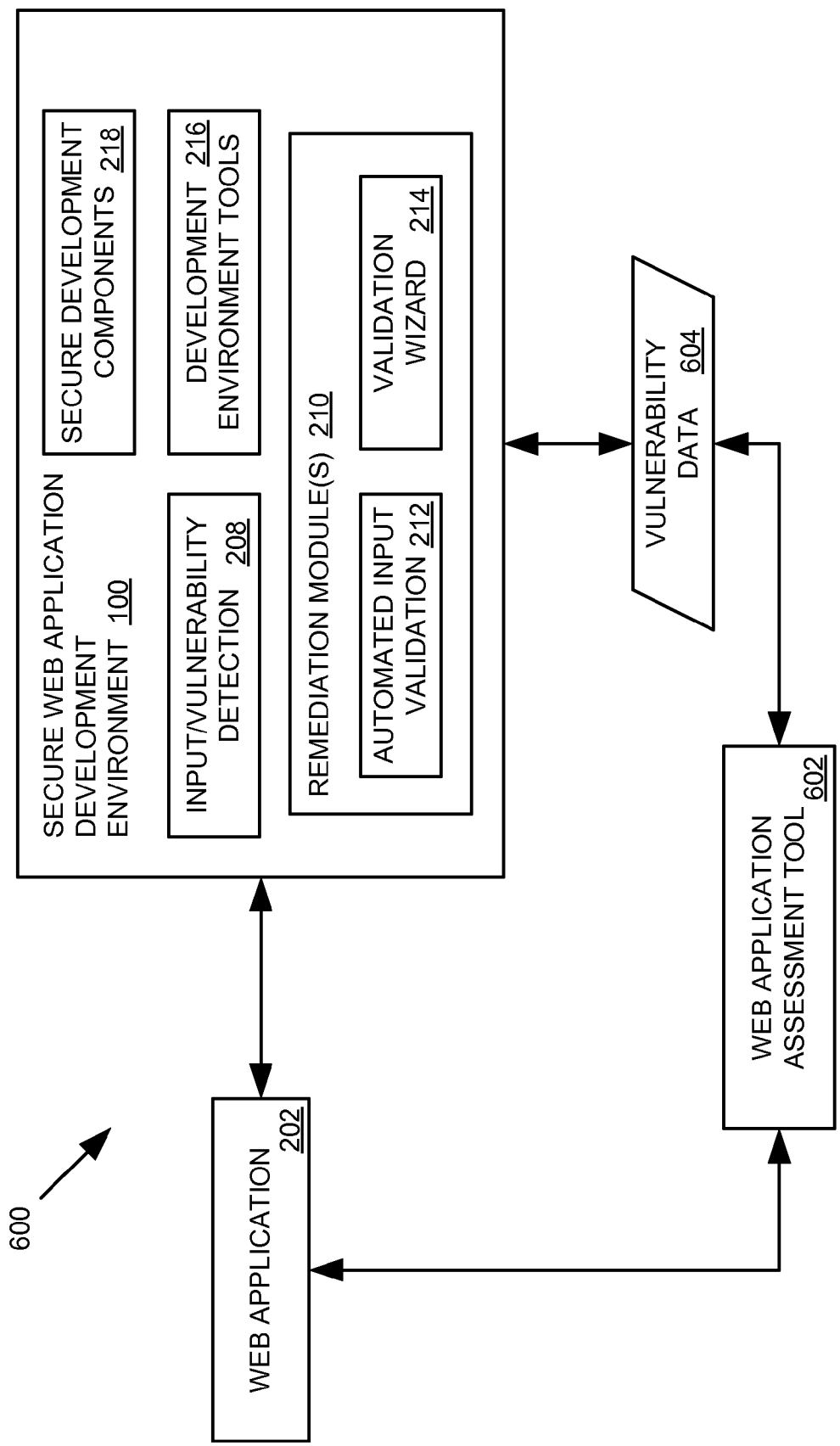
FIG. 6 is a block diagram illustrating another embodiment of a system for implementing a secure web application development environment.

FIG. 5 illustrates the architecture, operation, and/or functionality of another embodiment of secure web application development environment 100. At block 502, secure development is initiated. As illustrated, at block 504, secure web application development environment 100 interfaces with the code associated with the web application being developed. Secure web application development environment 100 may parse the code (or perform other types of code analysis as described above). At blocks 506 and 508, secure web application development environment 100 identifies the inputs or other vulnerabilities associated with the code, which require validation. At block 510, secure web application development environment 100 validates, repairs, remediates, or otherwise resolves the inputs/vulnerabilities. As mentioned above, the resolution of the inputs/vulnerabilities may be performed automatically by appropriate logic (e.g., validation database 404, pattern guessing module 408, etc.). In other embodiments, the inputs/vulnerabilities may be resolved via validation wizard 214 as described above. Regardless of the manner in which the inputs/vulnerabilities are resolved, at block 512, secure web application development environment 100 may modify the code as necessary.

As mentioned above and illustrated in FIG. 6, secure web application development environment 100 may be integrated with a web application assessment tool 602. After web application assessment tool 602 performs a scan of web application 202, the vulnerability data 604 associated with the scan may be provided to secure web application development environment 100. The vulnerability data 604 may be resolved within secure web application development environment 100 as described above.

One of ordinary skill in the art will appreciate that secure web application development environment 100 may be implemented in software, hardware, firmware, or a combination thereof. Accordingly, in one embodiment, secure web application development environment 100 is implemented in software or firmware that is stored in a memory and that is executed by a suitable instruction execution system. In hardware embodiments, secure web application development environment 100 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be further appreciated that the process descriptions or functional blocks in FIGS. 1-6 represent modules, segments, or portions of logic, code, etc. which include one or more executable instructions for implementing specific logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, secure web application development environment 100 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although this disclosure describes various embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A method for developing a secure web application, the method comprising:
   in a web application development environment:
      analyzing code, by a processor, associated with a web application to identify at least one security vulnerability;
      comparing the at least one security vulnerability to a vulnerability datastore, which stores validation routines for verifying input data associated with the at least one security vulnerability, to identify a recommended validation routine; and
      alleviating, by the processor, the security vulnerability by invoking a developer interface that enables a developer of the web application to select from a group of remediation actions including:
         generating remediation code and inserting the remediation code into the web application;
         generating remediation code and replacing a section of insecure code within the web application with the remediation code.

2. The method of claim 1, further comprising modifying the source code associated with the web application to include the remediation.

3. The method of claim 1, wherein the step of analyzing code associated with the web application comprises analyzing source code associated with the web application.

4. The method of claim 1, wherein the step of analyzing code associated with the web application comprises performing a static analysis on binary code associated with the web application.

5. The method of claim 1, further comprising remediating the operation of the web application if a restrictive policy is violated.

6. The method of claim 1, wherein the remediation code entered into the secure web application to alleviate a security vulnerability operates to enable a developer of the web application to validate the vulnerability.

7. The method of claim 6, wherein the remediation code further enables the steps of:
   displaying the identity of the security vulnerability to a developer of the web application; and
   displaying a recommended validation routine to be applied to the at least one security vulnerability.

8. The method of claim 1, wherein the remediation code entered into the secure web application to alleviate a security vulnerability operates to automatically remediate the web application vulnerability.

9. The method of claim 8, further comprising comparing the at least one security vulnerability to a vulnerability datastore to identify a remediation action to be taken.

10. A non-transitory computer-readable storage medium that stores a web application development environment program that, when executed, causes a processor to:
    operate a vulnerability identification module to analyze code of a web application and identify one or more vulnerabilities within said code;
    compare the one or more vulnerabilities to a vulnerability datastore, which stores validation routines for verifying input data associated with the at least one security vulnerability, to identify a recommended validation routine; and operate a remediation module to alleviate one or more of the vulnerabilities identified by the vulnerability detection module by switching at least one existing input authentication feature of said code between an enabled state and a disabled state.

11. The computer-readable storage medium of claim 10, wherein the web application development environment program further causes the processor to scan source code associated with the web application to identify said one or more vulnerabilities.

12. The computer-readable storage medium of claim 10, wherein the web application development environment program further causes the processor to operate an interactive wizard as part of the remediation module, the interactive wizard enables a developer of the web application to validate the vulnerabilities.

13. The computer-readable storage medium of claim 12, wherein the web application development environment program further causes the processor to operate the interactive wizard to provide a recommended validation routine for at least one of the vulnerabilities to the developer.

14. The computer-readable storage medium of claim 10, wherein the web application development environment program further causes the processor to operate the remediation module to process vulnerability data received from a web application assessment tool.

15. The computer-readable storage medium of claim 10, wherein the web application development environment program further causes the processor to operate the remediation module to automatically modify source code associated with the web application to alleviate a vulnerability.

16. A system for developing a secure web application, the system comprising:

a processor;

a web application development environment stored on a computer-readable storage medium and executed by the processor; and a vulnerability detection module integrated with operations of the web application development environment, the vulnerability detection module comprising:

logic configured to analyze code associated with a web application being developed via the web application development environment;

logic configured to identify vulnerabilities in the web application;

logic configured to compare at least one security vulnerability to a vulnerability datastore, which stores validation routines for verifying input data associated with the at least one security vulnerability, to identify a recommended validation routine; and a remediation module integrated with operations of the web application development environment, the remediation module comprising:

logic configured to provide remediation measures to alleviate at least one of said vulnerabilities by selectively forcing at least one existing authentication feature of said code to be enabled or disabled.

17. The system of claim 16, wherein the vulnerability detection module scans source code of said web application.

18. The system of claim 16, wherein the vulnerability detection module analyzes binary code of said web application.

19. The system of claim 16, wherein the remediation module includes a wizard that provides remediation options to a developer of said web application.

20. The system of claim 16, wherein the remediation module automatically identifies a remediation measure and implements the remediation measure.

* * * * *